United States Patent [19]

Guidoux

[11] Patent Number: 4,862,450
[45] Date of Patent: Aug. 29, 1989

[54] ARRANGEMENT FOR CANCELLING A COMPOSITE ECHO SIGNAL

[75] Inventor: Loïc B. Y. Guidoux, Garencieres, France

[73] Assignee: Telecommunications Radioelectriques Et Telephoniques T.R.T, Paris, France

[21] Appl. No.: 717,476

[22] Filed: Mar. 28, 1985

Related U.S. Application Data

[63] Continuation of Ser. No. 578,996, Feb. 14, 1984, abandoned, which is a continuation of Ser. No. 282,125, Jul. 10, 1981, abandoned.

[30] Foreign Application Priority Data

Jul. 21, 1980 [FR] France .................. 80 16048

[51] Int. Cl.$^4$ .......................................... H04B 3/24
[52] U.S. Cl. ............................ 370/32.1; 379/411
[58] Field of Search .............. 379/406, 410, 411; 370/32, 32.1

[56] References Cited

U.S. PATENT DOCUMENTS

| 4,072,830 | 2/1978 | Gitlin et al. | 379/411 |
| 4,162,378 | 7/1979 | Baudoux et al. | 379/411 |
| 4,355,214 | 10/1982 | Levy et al. | 370/32 |

OTHER PUBLICATIONS

N. Demytko, K. English; "Echo Cancellation on Time–Variant Circuits"; Proceedings of IEEE; vol. 65, No. 3; Mar. 1977; pp. 444–453.

Primary Examiner—Jin F. Ng
Assistant Examiner—Randall P. Myers
Attorney, Agent, or Firm—Thomas A. Briody; Jack E. Haken; Anne E. Barschall

[57] ABSTRACT

An arrangement for cancelling the composite echo signal formed by, for example, a linear component and a variable-phase component, comprises a linear echo canceller and a variable phase echo canceller, the difference circuits of these echo cancellers being arranged in cascade. The adjustable signal processing arrangements of each echo canceller are controlled for minimizing a predetermined function (mean square value or time average of this means square value), either of a residual echo signal appearing at the output of the difference circuit of this echo canceller itself or of a residual echo signal appearing at the output of the cascade arrangement of the difference circuits. In all cases the signal at the output of the linear echo canceller contains only a residual variable-phase signal which can be compensated for by the variable-phase echo canceller.

10 Claims, 5 Drawing Sheets

ARRANGEMENT FOR CANCELLING A COMPOSITE ECHO SIGNAL

This is a continuation of application Ser. No. 578,996 filed Feb. 14, 1984, now abandoned, which was a continuation of Ser. No. 282,125 filed July 10, 1981, now abandoned.

BACKGROUND OF THE INVENTION

The invention relates to an echo cancelling arrangement for processing a signal occurring in a first one-way path for cancelling a composite echo signal occurring in a second one-way path in response to said signal in the first path, said composite echo signal being formed by several components having different characteristics.

An echo canceller is used in, for example, a transceiver arrangement, whose one-way transmit and receive paths, which together form a four-wire circuit, are often coupled by a circuit known as a hybrid junction in a manner such that the arrangement has a two-wire access to the exterior. It is known that when a connection is established between two transceiver arrangements by their two-wire accesses, an echo signal, created by the signal in the transmit path of an arrangement and due to imperfections of the hybrid junctions and/or signal reflections in the connection, may be untimely produced in the receive path of the same arrangement. An echo canceller has for its object to automatically cancel this untimely echo signal appearing in the receive path. The advantage of this echo cancelling operation is that it enables a simultaneous transmission in both directions between two transceiver arrangements intercoupled by the two-wire accesses. The transceiver arrangements are, for example, modems used for data transmission.

Depending on the nature of the echo path, that is to say the path through which the signal from the transmit path passes in order to produce an echo signal in the receive path, this echo signal may have different characteristics.

When in this echo path only operations of a linear character occur which do not cause the phase or the frequency of the signal to change, a what is commonly referred to as a linear echo is involved which can be cancelled by an echo canceller which, by means of a linear operation performed on the signal in the transmit path, can automatically produce a simulated echo signal which is subtracted from the signal in the receive path. This type of linear echo canceller is generally known and described in detail in the literature: see, for example, French Patent Specification No. 2,377,734.

There are however echo paths producing echo signals having other characteristics. If, for example, a carrier system is included in the echo path, it may happen, in certain situations, that this echo signal has a frequency different from the frequency of the transmitted signal and consequently a time-variable phase. It is likewise possible that the echo path performs non-linear operations; this is, for example, the case when the echo path comprises compression-expansion systems which do not perfectly cancel each other or amplifiers producing harmonic distortion. It is not possible to solve the problem of cancelling an echo having such characteristics in a satisfactory manner by means of the conventional echo cancellers. See for this subject, for example, the article by E. J. Thomas, entitled "An adaptive Echo Canceller in a Nonideal Environment (Non-linear or Time Variant)" published in Bell System Technical Journal, Vol. 50, No. 8, October 1971, pages 2779-2795. Therefore, echo cancellers have recently been introduced which are especially arranged for cancelling an echo signal having a given characteristic. For instance, United States Patent Specification No. 4,072,830 or U.S. application Ser. No. 704,895, filed by Applicant on Feb. 22, 1985, which was a continuation of U.S. application Ser. No. 581,223, filed by Applicant on Feb. 22, 1984, which was a continuation of U.S. patent application Ser. No. 247,195, filed by applicants on March 24, 1981, which claimed priority of French patent application No. 80 06 748 filed March 26, 1980, which U.S. application is incorporated herein by reference and is referred to herein as 06/704,895 describe an echo canceller for a variable-phase echo signal. However, in practice, an echo signal may often by of a composite nature, that is to say it may be formed by the sum of several echo signals having different characteristics. So it rarely happens that a variable-phase echo signal is not accompanied by an echo signal having a linear characteristic. To all appearances, so far the specific problem of cancelling a composite echo signal has not yet been looked into.

SUMMARY OF THE INVENTION

The present invention has therefore for its object to solve this problem by providing an arrangement which makes it possible to cancel substantially all the components of a composite echo signal.

According to the invention, this echo cancelling arrangement is formed by a number of echo cancellers equal to the number of said components of the composite echo signal, said echo cancellers comprising respective adjustable signal processing arrangements connected to said first one-way path and arranged to produce variable signals having the respective characteristics of said components of the composite echo signal, said variable signals being applied to an input of respective difference circuits arranged in cascade in said second one-way path, the adjustable signal processing arrangement of each echo canceller being adjusted by a control circuit to minimize a predetermined function, either of a residual echo signal appearing at the output of the different circuit of this echo canceller itself, or of a residual echo signal appearing at the output of the cascade arrangement of the said different circuits.

For the case in which the arrangement in accordance with the invention has for its object to cancel a composite echo signal comprised of a linear component and a variable-phase component, said arrangement is formed by a linear echo canceller, whose difference circuit has one input coupled to the input of said second one-way path, and a variable-phase echo canceller, whose difference circuit has one input coupled to the output of said difference circuit of the linear echo canceller, the linear echo canceller comprising an adjustable transversal filter, whose output is connected to the other input of its own difference circuit. If this arrangement has a series structure, then the control circuit for the adjustment of the coefficients of the transversal filter of the linear echo canceller is arranged to minimize a predetermined function of the residual echo signal present on the output of its own difference circuit. If the arrangement has a parallel structure, then the control circuit for the adjustment of the transversal filter of the linear echo canceller is arranged to minimize a predetermined function of the residual echo signal present at the output of the difference circuit of the variable-phase echo canceller.

The control circuit for the adjustment of the coefficients of the linear echo canceller may be arranged to minimize the mean square value of the residual echo signal or the time average of this mean square value. Different variants of the control circuit will be described hereinafter.

As will be demonstrated, it is achieved in practice that in all cases, the linear component of the composite echo signal is cancelled at the output of the linear echo canceller and that at this output there only appears a variable-phase signal which the variable-phase echo canceller is capable of cancelling.

DESCRIPTION OF THE DRAWINGS

Embodiments of the invention and their advantages will now be further described, by way of non-limitative example, with reference to the accompanying drawings, in which.

DESCRIPTION OF THE PREFERRED EMBODIMENTS

Figure 1:
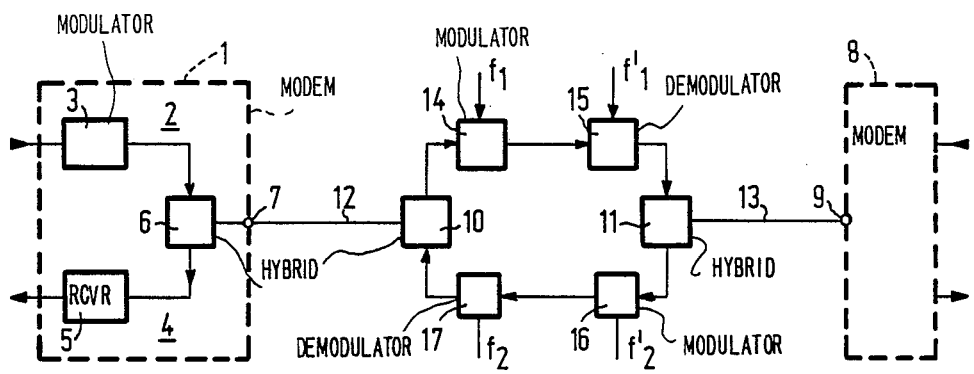
FIG. 1 shows a block diagram of a transmission system capable of producing a composite echo signal.

FIG. 1 shows, by way of example, the basic block diagram of a data transmission system which may produce a composite echo signal. A modem 1 comprises a transmit path 2 which includes a modulator 3 receiving data from a terminal (not shown) and a receive path 4 which includes a receiver 5 supplying data to this terminal. The output of modulator 3 and the input of receiver 5 are coupled to a two-wire access 7 of the modem by means of a hybrid junction 6. A remote modem 8 comprises the same elements, not shown in FIG. 1, and also has a two-wire access 9.

The connection between the two modem comprises two-wire transmission lines 12 and 13, which have one end connected to the modems and the other end to a four-wire transmission section with carrier systems. At its extremities, this section comprises two hybrid junctions 10 and 11 to change from a two-wire to a four-wire connection. For one transmission direction this transmission section with carrier systems comprises a modulator 14 and a demodulator 15 utilizing carrier frequencies $f_1$ and $f'_1$, respectively, and for the other transmission direction a modulator 16 and a demodulator 17 utilizing carrier frequencies $f'_2$ and $f_2$, respectively.

When a data signal is transmitted through transmit path 2 of modem 1 towards modem 8, it is possible that in receive path 4 of this modem 1 a composite echo signal occurs which originates from several echo paths. It is first assumed that no non-linear operations occur in the connection between the two modems. If the balance of hybrid junction 6 is not perfect and/or if signal reflection occurs in transmission line 12, then an invariable-phase echo signal appears in receive path 4. If the balance of hybrid junction 11 is not perfect and/or if signal reflection occurs in transmission line 13, and if, furthermore, the frequencies $f_1$, $f'_1$ and $f_2$, $f'_2$ in the carrier system are such that $(f'_1-f_1) \neq (f'_2-f_2)$, then there appears in receive path 4 an echo signal which is subjected to a frequency offset of, for example, some Hz and consequently has a time-varying phase. These echo paths often exist simultaneously, so that there appears in receive path 4 a composite echo signal having a linear component and a variable-phase component. These components might furthermore be subjected to non-linearities in the case non-linear operations were performed in the corresponding echo signal paths.

The invention provides an arrangement which can be included in modem 1 for cancelling a composite echo signal occurring in receive path 4. The situation in which the composite echo signal comprises a linear component and a variable-phase component will be described in detail hereinafter.

Figure 2:
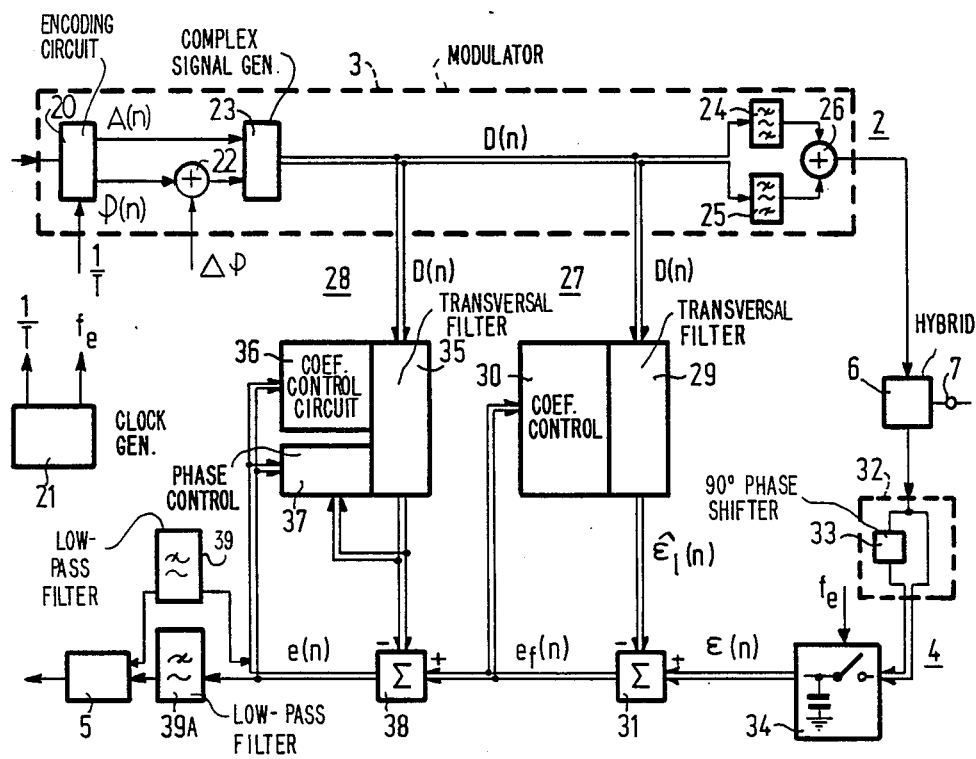
FIG. 2 shows a block diagram of an arrangement in accordance with the invention having a series structure which employs complex difference signals and which may be used for an echo signal having a linear component and a variable-phase component.

FIG. 2 shows a block diagram of an embodiment of the echo cancelling arrangement in accordance with the invention having what is referred to as a series structure. Associated with this echo canceller are the elements of modem 1, shown already in FIG. 1, which are given the same reference numerals. Let it be assumed, by way of example, that this modem employs phase modulation or phase and amplitude modulation of a carrier for the data transmission and that for forming the modulated carrier signal in modulator 3 use is made of a digital modulation technique which is known as echo modulation.

In the simplified form shown, modulator 3 comprises an encoding circuit 20 receiving the data to be transmitted and producing a pair of signals representative of the amplitudes $A(n)$ and the phase changes $\emptyset(n)$ to be assigned to the carrier as a function of the data at instants nT determined by a generator 21 of the clock frequency $1/T$, $1/T$ being the modulation rate and n being an integer varying between $-\infty$ and $+\infty$. In order to take into account the phase change $\Delta\phi$ of the (unmodulated) carrier during each modulation interval T, an adder 22 is used for forming at each instant nT the sum $\phi(n) + \Delta\phi$ which is representative of the absolute phase $\Psi(n)$ of the modulated carrier to be transmitted. The two signals representative of the amplitude $A(n)$ and the absolute phase $\Psi(n)$ of the carrier are applied to a circuit 23 which forms the real component $A(n) \cdot \cos \Psi(n)$ and the imaginary component $A(n) \cdot \sin \Psi(n)$ of the complex signal having modulus $A(n)$ and argument $\Psi(n)$. These two components are applied to bandpass filters 16 and 17, respectively, whose output signals are added together in an adder 26 for forming the analog modulated carrier signal which is applied to the transmit access of hybrid junction 6.

In the arrangement in accordance with the invention, use is made of the complex signal, whose real and imaginary components are, in this example, available at the output of circuit 23 at the instants nT. The complex signal thus defined will be referred to as complex data signal or data signal hereinafter, and will be denoted by D(n). In the event that the real and imaginary components of this complex signal D(n) are not available when a different type of modulator 3 is used, it will always be possible to incorporate, in the echo canceller, circuits which form these components from the actual data to be transmitted.

It should be noted here that in the different block diagrams shown hereinafter the connections represented by a double line convey the two real and imaginary components of a complex signal, but that for simplicity of the description, mention will only be made hereinafter of complex signals conveyed by these connections. Likewise, it is obvious that when complex signals are applied to processing circuits, these processing operations will in practice be carried out on their real and imaginary components which are real signals, and the processing operations carried out in practice will generally not be further described as they result from formulae which are known from complex number systems.

At the receive access of hybrid junction 6 there appears in response to the signal produced by modulator 3 a composite echo signal which is formed in the manner described with reference to FIG. 1 and which comprises a linear component and a variable-phase component.

To enable cancelling of this composite echo signal, the echo cancelling arrangement in accordance with the invention comprises two echo cancellers 27 and 28, which process the complex signals D(n) sampled at the instants nT and assumed to be of the analog type.

The echo canceller 27 is arranged for cancelling a linear echo signal. This canceller 27 comprises an adjustable signal processing arrangement 29 in the form of a transversal filter having a control circuit 30 for adjusting the coefficients of this filter. The variable complex output signal of transversal filter 29 is applied to the (−) input of a difference circuit 31. Samples of an analog complex signal formed from the signal appearing at the receive access of hybrid junction are applied to the (+) input of this difference circuit 31. For forming these samples, use is made of a circuit 32 which produces a complex signal whose real part is the signal coming from the hybrid junction 6 and whose imaginary part is the same signal but whose phase is shifted over 90° by means of a phase shifter 33. The complex signal supplied by circuit 32 is applied to a sample- and hold-circuit 34 in which sampling is effected at a rate $f_e$ supplied by generator 21. This sampling rate $f_e$ is a multiple of the modulation rate 1/T and is such that the Shannon theorem is satisfied as regards the composite echo signal, that is to say as regards the signal transmitted by modulator 3. To simplify the formulae for the calculations to be performed, of the samples supplied by circuit 34, only those samples which occur at a rate 1/T at the same instant nT as the samples of the data signal D(n) will be considered. The complex difference signal produced by difference circuit 31 is applied to control circuit 30 in which it will be employed, as will be explained hereinafter, for adjusting the coefficients of transversal filter 29.

The echo canceller 28 is arranged for cancelling a variable-phase echo signal. This canceller 28 can be realized in accordance with any prior art technique, for example the technique described in the already mentioned United States Pat. No. 4,072,830 or U.S. patent application Ser. No. 06/704,895. In the proposed simplified form, echo canceller 28 comprises an adjustable signal processing arrangement 35 which receives data signal D(n) and which is intended to produce a complex variable-phase signal. To this end, this signal processing arrangement 35 is composed of a transversal filter in series with a phase shifter, no distinction for these two elements having been made in the circuit diagram. The coefficients of the transversal filter are adjusted by means of a coefficient control circuit 36, while the phase shift performed by the phase shifter is adjusted by means of a phase control circuit 37. The complex variable-phase signal produced by signal processing arrangement 35 is applied to the (−) input of a difference circuit 38. The (+) input of this difference circuit 38 is connected to the output of the other difference circuit 31. The complex difference signal supplied by difference circuit 38 is applied to coefficient control circuit 36 and to phase control circuit 37, the latter also receiving the output signal of signal processing arrangement 35.

In the structure of the echo canceller arrangement shown in FIG. 2, designated series structure, the circuits for adjusting echo cancellers 27 and 28 are each controlled in such a manner by the difference signal formed in each echo canceller that the residual echo signal contained therein is minimized. More particularly, in echo canceller 27, circuit 30 for adjusting the coefficients of filter 29 is controlled by the signal supplied by difference circuit 31 which includes a composite residual echo signal. Hereinafter, different algorithms for controlling the coefficients by filter 29 and being employed in circuit 30 will be described, all algorithms permitting cancellation of the linear component of the composite echo signals in the difference signal supplied by circuit 31, so that this difference signal only includes a variable-phase signal which can be cancelled naturally by variable-phase echo canceller 28.

Of the complex signal which is supplied by difference circuit 38 and from which any echo signal has been removed, receiver 5 of the modem uses only the real component previously filtered in a low-pass filter 39.

It is not necessary to give a detailed description of the implementation of the transversal filters employed in the arrangement in accordance with the invention. It is known that a transversal filter such as filter 29 comprises means (for example a delay line) for storing a predetermined number of consecutive samples of the complex signal D(n) applied to its input, calculation means for weighting these consecutive samples with complex coefficients supplied by control circuit 30 and for forming the sum of the weighted samples. Since in FIG. 2 it was assumed that the echo canceller processes samples of analog signals, the transversal filters used must be of the analog type and they can, for example, be realized by means of arrangements which are known as CCD ("Charge-Coupled Device"). However, it will be obvious that alternatively use may be made of digital transversal filters by performing suitable signal conversions.

Now the algorithms will be described which are employed in control circuit 30 for modifying the coefficients of filter 29 in order to obtain the above-mentioned results, more particularly, the result that echo canceller 27 cancels the linear component of the composite echo signal and produces a variable-phase signal which can be cancelled by echo canceller 28.

To simplify the explanations and the calculations, it is assumed, as is customary, that only the local modem transmits and that consequently there is applied to receive path 4 of this modem only the composite echo signal produced by modulator 3, no data signal originating from the remote modem. First of all, all the quantities, signals and notations used hereinafter will be defined. At the sampling instants nT:

$\epsilon(n)$ is the composite complex echo signal supplied by sampling circuit 34;

$\epsilon_p(n)$ is a complex signal which is the linear part of the composite echo signal $\epsilon(n)$;

$\epsilon_f(n)$ is a complex signal which is the variable-phase part of the composite echo signal $\epsilon(n)$;

$\phi(n)$ is the phase of the variable-phase echo signal;

$\hat{\epsilon}_p(n)$ is the complex signal supplied by transversal filter 29 of linear echo canceller 27;

$\epsilon_f(n)$ is the complex difference signal supplied by difference circuit 31 and including only one echo signal in the case considered here; this difference signal applied to control circuit 30 is alternatively denoted error signal of echo canceller 27;

$e(n)$ is the complex difference signal supplied by difference circuit 38 and alternatively denoted error signal of the echo canceller 28.

From the definition of the composite echo signal it follows that:

$$\epsilon(n) = \epsilon_p(n) + \epsilon_f(n)$$

On the other hand, at an instant nT, transversal filter 29 stores N preceding samples of the complex data signal D(n) applied to its input, it being possible to use the notation D(n-q) for these samples, where q is an integer varying from 0 to N-1. By using a vector notation, these N samples D(n-q) may be considered as the components of a vector $\vec{D}(n)$ so that:

$$\vec{D}(n) = \begin{bmatrix} D(n) \\ D(n-1) \\ \cdot \\ \cdot \\ \cdot \\ D(n-N+1) \end{bmatrix}$$

Likewise, at an instant nT, the N coefficients $c_q(n)$ of the transversal filter may be considered as the components of a vector $\vec{c}(n)$ so that $$\vec{c}(n) = \begin{bmatrix} c_0(n) \\ c_1(n) \\ \cdot \\ \cdot \\ \cdot \\ c_{N-1}(n) \end{bmatrix}$$

The respective transpose $\underline{c}(n)$ and $\underline{D}(n)$ of the vectors $\vec{c}(n)$ and $\vec{D}(n)$ may be written as:

$$\underline{c}(n) = [c_0(n) \, c_1(n) \ldots c_{N-1}(n)]$$

$$\underline{D}(n) = [D(n) \, D(n-1) \ldots D(n-N+1)].$$

It is known that each sample of the signal $\hat{\epsilon}_p(n)$ supplied by transversal filter 29 is the result of the convolution operation:

$$\hat{\epsilon}_p(n) = \sum_{q=0}^{N-1} D(n-q) \, c_q(n)$$

In vector notation this operation is written as:

$$\hat{\epsilon}_p(n) = \underline{c}(n) \, \vec{D}(n) = \underline{D}(n) \cdot \vec{c}(n) \qquad (1)$$

Similar notations can be used to describe the complex linear echo signal $\epsilon_p(n)$ and the complex variable-phase echo signal $\epsilon_f(n)$ which together form the composite echo signal.

If h designates the impulse response of the path to which data signal D(n) is applied for producing the complex linear echo signal $\epsilon_p(n)$, a vector $\vec{h}$ can be defined having as components the values $h_q$ of said impulse response at the instants qT. If $\underline{h}$ is the transpose of the vector $\vec{h}$, the linear echo signal $\epsilon_p(n)$ may be written as:

$$\epsilon_p(n) = \underline{h} \cdot \vec{D}(n) = \underline{D}(n) \cdot \vec{h} \qquad (2)$$

If k designates the impulse response of the path to which data signal D(n) is applied for producing the complex variable-phase echo signal $\epsilon_f(n)$, a vector $\vec{k}$ can likewise be defined having as components the values $k_q$ of said impulse response at the instants qT. If $\underline{k}$ is the transpose of the vector $\vec{k}$ and if the variable phase $\phi(n)$ produced by this echo signal path is taken into account, the variable-phase echo signal $\epsilon_f(n)$ may be written as:

$$\epsilon_f(n) = \underline{k} \cdot \vec{D}(n) \cdot \exp[j\phi(n)] = \underline{D}(n) \vec{k} \cdot \exp[j\phi(n)] \qquad (3)$$

With regard to the variable phase $\phi(n)$ of the echo signal, the following should be noted. Hereinafter it is assumed that the phase $\phi(n)$, which is used in formula (3) and is time-varying (that is to say depending on n), satisfies the condition that its time average is zero. This condition may be written as:

$$\overline{\phi(n)} = 0$$

In this notation, which will often be used hereinafter, the overbar indicates that the time average is taken of the quantity above which this overbar is drawn.

This condition is particularly satisfied in the practical case explained with reference to FIG. 1 in which the variable phase $\phi(n)$ is caused by a frequency offset $\omega$ of the carrier; if $\Delta\Phi$ is the constant change of said frequency during each time interval T, it namely holds that $\phi(n) = n.\Delta\omega.T$ and the time average $$\overline{\phi(n)}$$

is of course zero.

The case in which the time average of the variable phase $\phi(n)$ is not equal to zero, but equal to a fixed phase $\phi_o$, can be reduced, by modifying the variables in formula (3), to the case in which the time average of the variable phase is zero. This formula (3) may namely be written as:

$$\epsilon_f(n) = \underline{k} . \exp[j\phi_o] . \vec{D}(n) . \exp j[\phi(n) - \phi_o]$$

From this it follows that, by replacing k in formula (3) by k exp $[j\phi_o]$, a phase $[\phi(n)-\phi_o]$ figures in the formula, the time average of which is zero.

In a first variant of the echo canceller of FIG. 2, the criterion used in circuit 30 for adjusting the coefficients $\vec{c}(n)$ is the minimization of the quantity r(n) given by $$r(n) = \overline{E|e_f(n)|^2} \quad (4)$$

In this expression, E is an operator which indicates the statistic average or the mathematical expectation of the subsequent quantity. Put differently, in accordance with this criterion, the quantity r(n) to be minimized is the time average of the mean square value of the error signal $e_f(n)$.

It is known that if the algorithm of the gradient is used to minimize the quantity r(n), the coefficients c(n) of the filter must be adjusted in accordance with the following recursion formula connecting the coefficients $\vec{c}^i(n)$ at iteration i with the coefficients $\vec{c}^{i+1}(n)$ at iteration (i+1):

$$\vec{c}^{i+1}(n) = \vec{c}^i(n) - \frac{\alpha}{2} \frac{\partial r(n)}{\partial \vec{c}(n)}$$

so:

$$\vec{c}^{i+1}(n) = \vec{c}^i(n) - \frac{\alpha}{2} \frac{\partial E|e_f(n)|^2}{\partial \vec{c}(n)}$$

In this formula (5), $\alpha$ is a coefficient less than 1 which determines the magnitude of the modification of the coefficients, this modification being calculated at each iteration i.

To use recursion formula (5) in practice, the partial derivative $$\frac{\partial E|e_f(n)|^2}{\partial \vec{c}(n)}$$

is expressed in a form which causes simple processings of these signals to appear.

It is clear that the error signal $e_f(n)$ has for its expression:

$$\begin{aligned} e_f(n) &= \epsilon(n) - \epsilon_f(n) \\ &= \epsilon_f(n) + \epsilon_f(n) - \epsilon_f(n) \end{aligned}$$

so, by using formulae (1) and (2):

$$e_f(n) = \vec{D}(n).[\vec{h}-\vec{c}(n)] + \epsilon_f(n) \quad (6)$$

To calculate the partial derivative $$\frac{\partial E|e_f(n)|^2}{\partial \vec{c}(n)}$$

it is assumed that $$\vec{c}(n) = \vec{a}(n) + j\vec{b}(n),$$

where $\vec{a}(n)$ and $\vec{b}(n)$ are vectors whose components are the real parts and the imaginary parts, respectively, of the complex coefficients $\vec{c}(n)$.

Hereafter the complex conjugate of a complex quantity is denoted by providing this complex quantity with an asterisk as the index.

As $|e_f(n)|^2 = e_f(n).e_f^*(n)$, it holds that:

$$\begin{cases} \dfrac{\partial E|e_f(n)|^2}{\partial \vec{a}(n)} = E\left[ e_f(n) \cdot \dfrac{\partial e_f^*(n)}{\partial \vec{a}(n)} + e_f^*(n) \cdot \dfrac{\partial e_f(n)}{\partial \vec{a}(n)} \right] \\ \dfrac{\partial E|e_f(n)|^2}{\partial \vec{b}(n)} = E\left[ e_f(n) \cdot \dfrac{\partial e_f^*(n)}{\partial \vec{b}(n)} + e_f^*(n) \cdot \dfrac{\partial e_f(n)}{\partial \vec{b}(n)} \right] \end{cases}$$

On the other hand it holds, taking account of formula (6).

$$\begin{cases} \dfrac{\partial e_f(n)}{\partial \vec{a}(n)} = -\vec{D}(n) \\ \dfrac{\partial e_f(n)}{\partial \vec{b}(n)} = -j\vec{D}(n) \\ \dfrac{\partial e_f^*(n)}{\partial \vec{a}(n)} = -\vec{D}^*(n) \\ \dfrac{\partial e_f^*(n)}{\partial \vec{b}(n)} = -j\vec{D}^*(n) \end{cases}$$

By means of simple calculations it is possible to derive therefrom:

$$\frac{\partial E|e_f(n)|^2}{\partial \vec{a}(n)} = -E\left[ e_f(n) \cdot \vec{D}^*(n) + e_f^*(n) \cdot \vec{D}(n) \right] =$$

$$-2E\left\{ \mathbb{R}_e \left[ e_f(n) \cdot \vec{D}^*(n) \right] \right\} \frac{\partial E|e_f(n)|^2}{\partial \vec{b}(n)} =$$

$$E\left\{ j\left[ e_f(n) \cdot \vec{D}^*(n) - e_f^*(n) \cdot \vec{D}(n) \right] \right\} =$$

$$-2E\left\{ \mathbb{I}_m \left[ e_f(n) \cdot \vec{D}^*(n) \right] \right\}$$

In these last formulae $\mathbb{R}_e$ and $\mathbb{I}_m$ signify the real part and the imaginary part of the complex quantity between brackets.

By putting:

$$\frac{\partial E|e_f(n)|^2}{\partial \vec{c}(n)} = \frac{\partial E|e_f(n)|^2}{\partial \vec{a}(n)} + j \frac{\partial E|e_f(n)|^2}{\partial \vec{b}(n)}$$

it is obtained that:

$$\frac{\partial E|e_f(n)|^2}{\partial \vec{c}(n)} = -2E\left[ e_f(n) \cdot \vec{D}^*(n) \right] \quad (7)$$

By taking account of formula (7), recursion formula (5) indicating the modification of the coefficients $\vec{c}(n)$ may finally be written as:

$$\vec{c}^{i+1}(n) = \vec{c}^{i}(n) + \alpha \overline{E\left[e_f(n) \cdot \vec{D}^*(n)\right]} \quad (8)$$

It will now be demonstrated that if this recursion formula (8) is used with a number of iterations $i \to \infty$, the coefficients $\vec{c}(n)$ of the transversal filter 29 converge to the samples $\vec{h}$ of the impulse response of the linear echo path, which in accordance with formula (6) means that the error signal $e_f(n)$ comprises only the variable-phase component $\epsilon_f(n)$ of the composite echo signal and that the linear component $\epsilon_p(n)$ has been cancelled. To prove this the quantity $J(n)$ will be evaluated which must be calculated at each iteration i for modifying the coefficients $c^i(n)$:

$$J(n) = \overline{E\left[e_f(n) \cdot \vec{D}^*(n)\right]} \quad (9)$$

The quantity $I(n)$ is evaluated first:

$$I(n) = E\left[e_f(n) \cdot \vec{D}^*(n)\right] \quad (10)$$

By taking account of formulae (3) and (6) this quantity $I(n)$ may be written as:

$$I(n) = \left[\vec{h} - \vec{c}(n)\right] \cdot E\left[\vec{D}^*(n) \cdot \vec{D}(n)\right] + \vec{k} \cdot \exp[j\,\phi(n)] \cdot E\left[\vec{D}^*(n) \cdot \vec{D}(n)\right] \quad (11)$$

In both terms of this expression for $I(n)$ the quantity $$A = E\left[\vec{D}^*(n) \cdot \vec{D}(n)\right]$$

appears. This quantity A is a matrix whose elements are:

$$A = \begin{bmatrix} E[D(n) \cdot D^*(n)] & E[D(n) \cdot D^*(n-1)] & \ldots & E[D(n) \cdot D^*(n-N+1)] \\ E[D(n-1) \cdot D^*(n)] & E[D(n-1) \cdot D^*(n-1)] & \ldots & E[D(n-1) \cdot D^*(n-N+1)] \\ \cdot & \cdot & & \cdot \\ \cdot & \cdot & & \cdot \\ \cdot & \cdot & & \cdot \\ E[D(n-N+1) \cdot D^*(n)] & E[D(n-N+1) \cdot D^*(n-1)] & \ldots & E[D(n-N+1) \cdot D^*(n-N+1)] \end{bmatrix}$$

In this matrix, all elements different from the elements on the main diagonal are zero, the reason being that they are each the statistical average of a product of two vectors representing data transmitted at different instants and consequently without any mutual correlation. The elements on the main diagonal are equal to the same constant which represents the power of the transmitted data and is assumed as being normalized at 1 hereinafter. Thus, the quantity A is equal to the identity matrix and formula (11) is consequently reduced to:

$$I(n) = E[e_f(n) \cdot \vec{D}^*(n)] = \vec{h} - \vec{c}(n) + \vec{k} \cdot \exp[j\,\phi(n)] \quad (12)$$

The quantity $J(n)$ which must be calculated at each iteration i is therefore in accordance with formula (9) the time average of quantity $I(n)$ given in formula (12).

By taking account of the fact that $\vec{h}$ and $\vec{k}$ are time-invariant and that $\vec{c}(n)$ is also substantially time-invariant if it is assumed that the modification rate of the coefficients $c(n)$ is low, it may be written:

$$J(n) = \vec{h} - \vec{c}(n) + \vec{k} \cdot \exp[j\,\phi(n)]$$

As has been assumed in the foregoing, the starting point is the hypothesis $$\dot{\phi}(n) = 0,$$

from which it follows that:

$$\exp[j\,\phi(n)] = 0.$$

This results in that $J(n) = \vec{h} - \vec{c}(n)$ and in that for iteration i this quantity has the value $\vec{h} - \vec{c}^i(n)$. So recursion formula (8) may be written as:

$$\vec{c}^{i+1}(n) = \vec{c}^i(n) + \alpha[\vec{h} - \vec{c}^i(n)] \quad (13)$$

or:

$$\vec{c}^{i+1}(n) = \vec{c}^i(n)(1 - \alpha) + \alpha\vec{h}$$

Last-mentioned expression (13) for the recursion formula (8) has the classical shape $$\vec{c}^{i+1}(n) = \lambda\,\vec{c}^i(n) + \mu$$

where $\lambda = (1 - \alpha)$ and $\mu = \alpha\vec{h}$, for which it is known that for $i \to \infty$ it holds that:

$$\vec{c}^i(n) = (\lambda)^i\left(\vec{c}^0(n) - \frac{\mu}{1-\lambda}\right) + \frac{\mu}{1-\lambda}$$

where $(\lambda)^i$ signifies $\lambda$ to the power i.

By applying this result to recursion formula (13) it follows that for $i \to \infty$ the coefficients $\vec{c}^i(n)$ may be written as:

$$\vec{c}^i(n) = (1-\alpha)^i(\vec{c}^0(n) - \vec{h}) + \vec{h},$$

where $\vec{c}^0(n)$ corresponds to the initial value for the coefficients at iteration $i = 0$. Since $0 < \alpha < 1$, it appears that for $i \to \infty$ the coefficients $\vec{c}^i(n)$ converge to $\vec{h}$.

This means that by employing recursion formula (7) in echo canceller 27, after a certain number of iterations, a cancellation of the linear component $\epsilon_p(n)$ of the composite echo signal in the difference signal supplied by circuit 31 is substantially achieved; this difference signal then substantially contains only the variable-phase component $\epsilon_f(n)$ of the composite echo signal. Echo canceller 28 arranged for cancelling a variable-phase echo then renders it possible to eliminate any echo signal at the input of receiver 5.

Figure 3:
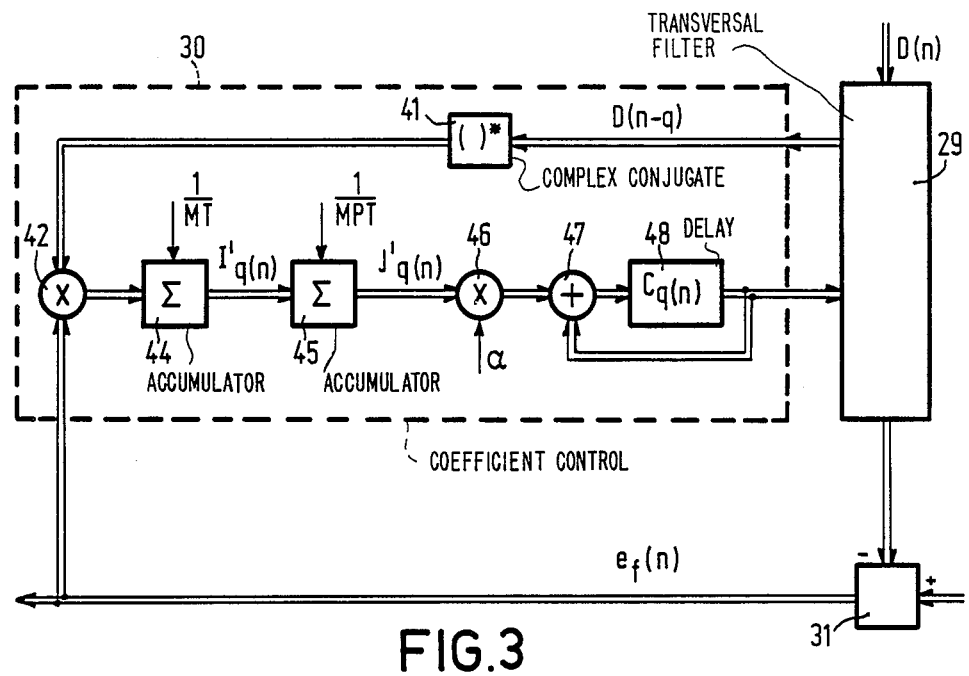
FIG. 3 and FIG. 4 show an embodiment of the control circuit of the linear echo canceller of the arrangement shown in FIG. 2.

With reference to FIG. 3 it will now be described how recursion formula (8) can be employed in coefficient control circuit 30. The block diagram shown, which is identical for all coefficients, relates to one of the complex coefficients $c_q(n)$ of transversal filter 29 which at the instant nT is multiplied in this filter by the complex sample D(n-q) corresponding to the data. For this coefficient $c_q(n)$ having values $c_q^i(n)$ and $c_q^{i+1}(n)$ at iterations i and i+1, recursion formula (8) is written as:

$$c_q^{i+1}(n) = c_q^i + (n) + \alpha\, E[e_f(n) \cdot D^* (n - q)] \quad (14)$$

The use of this recursion formula assumes the calculation at each iteration of the quantity:

$$J_q(n) = E[e_f(n) \cdot D^* (n - q)]$$

Calculating the approximate value of this quantity $J_q(n)$ may be performed in two stages. In a first stage, an approximate value $I'_q(n)$ of the statistical average $I_q(n)$ is calculated:

$$I_q(n) = E[e_f(n) \cdot D\ (n - q)]$$

This approximate value $I'_q(n)$ is obtained by forming, at the rate 1/T of the signal samples D(n), the products $e_f(n)\cdot \tilde{D}(n-q)$ and subsequently forming at a rate 1/MT (M being an integer >1) the sum of M of these consecutive products. Calculating $I'_q(n)$ is consequently performed in accordance with the formula:

$$I_q'(n) = \sum_{j=0}^{M-1} e_f(n-j) \cdot D^*(n-q-j) \quad (15)$$

In a second stage, an approximate value $J'_q(n)$ of $J_q(n)$ is calculated by forming at a rate 1/MPT (P being an integer >1), coinciding with the rate chosen for the interactions, the sum of P consecutive values of $I'_q(n)$. So this calculation of $J'_q(n)$ is performed in accordance with the formula:

$$J_q'(n) = \sum_{k=0}^{P-1} I_q'(n - k) \quad (16)$$

Using recursion formula (14) in accordance with the method just explained finds expression in the embodiment of control circuit 30 shown in FIG. 3.

This circuit 30 comprises, for the adjustment of a coefficient $c_q(n)$, a circuit 41 which forms at a rate 1/T the complex conjugate value $\tilde{D}(n-q)$ of the complex samples D(n-q) supplied by filter 29. A circuit 42 for multiplying complex signals forms at a rate 1/T the consecutive products of $\tilde{D}(n-q)$ and error signal $e_f(n)$ supplied by difference circuit 31. At a rate 1/MT (which may be derived from clock generator 21) a circuit 44 forms the sum of M of these consecutive products and consequently produces at a rate 1/MT the quantity $I'_q(n)$ in accordance with formula (15). This circuit 44 is, for example, an accumulator (well-known as such and therefore not detailed here) whose content is read and thereafter reset to zero at a rate 1/MT. A circuit 45 forms at a rate 1/MPT (which may be derived from clock generator 21) the sum of P consecutive quantities $I'_q(n)$ and consequently produces the quantity $J'_q(n)$ in accordance with formula (16) at a rate 1/MPT. A multiplier 46 multiplies the quantity $J'_q(n)$ by the coefficient $\alpha$ and produces at a rate 1/MPT an approximate value of the modifying term $$\alpha\, E[e_f(n) \cdot D^* (n - q)]$$

of the coefficient occurring in recursion formula (14). By means of an adder 47 this approximate modifying term $\alpha J'_q(n)$ is added at each iteration i to te coefficient of value $c_q^i(n)$ at the output of a delay circuit 48 having a time delay MPT to form the coefficient $c_q^{i+1}(n)$ to be used at iteration i+1.

As explained above, the weighting coefficient $\alpha$ figuring, at each iteration in the magnitude of the modification of the coefficients, must satisfy the requirement that it must be less than 1. In the embodiment of the control circuit for adjusting the coefficients described with reference to FIG. 3, a weighting coefficient $\alpha$ may be chosen relatively close to 1, which, at each iteration, results in comparatively high values for the modification of the coefficients.

In a simpler embodiment of control circuit 30, the necessity of calculating a statistical average in circuit 43 and a time average in circuit 44 may be avoided by using, instead of formula (13), the following recursion formula:

$$c_q^{i+1}(n) = c_q^i(n) + \alpha'[e_f(n) \cdot D^* (n - q)] \quad (17)$$

In this formula (17), the weighting coefficient $\alpha'$ is very small relative to 1, while the iteration rate is the rate 1/T of the signal samples D(n). To apply this recursion formula, it is sufficient to connect the output of multiplier 42 directly to the input of multiplier 46 to which a coefficient $\alpha'$ is applied which is very small relative to 1. By connecting the output of multiplier 46 to an input of an adder 47, which is connected to a delay circuit 48 having a time delay T, there is obtained, at the output of this delay circuit 48, a coefficient $c_q(n)$ which is modified at a rate 1/T. With this embodiment of the control circuit for the coefficients, the modification of the coefficients is effected in very small increments, in accordance with the value of $\alpha'$, and the simplicity of the operation is obtained at the cost of a longer convergence time than in the embodiment of FIG. 3.

In a second variant of the echo cancelling arrangement of FIG. 2, which will now be described, the criterion used for the adjustment of the coefficients is the minimization of the quantity r'(n) given by:

$$r'(n) = E|e_f(n)|^2$$

This quantity r'(n) differs from the quantity r(n) to be minimized in the first variant in that the time average operator is omitted.

By using the gradient algorithm the adjustment of the coefficients $\tilde{c}(n)$ of transversal filter 29 must be performed in accordance with a recursion formula which is comparable to formula (5) and has the following form:

$$\vec{c}^{i+1}(n) = \vec{c}^i(n) - \frac{\alpha}{2} \frac{\partial E|e_f(n)|^2}{\partial c(n)} \quad (5)$$

On the basis of the above calculations it can be easily seen that the recursion formula to be used in practice is:

$$\vec{c}^{i+1}(n) = \vec{c}^i(n) + \alpha E[e_f(n) \cdot \vec{D}^*(n)] \quad (18)$$

This formula (18) is comparable to formula (8) which corresponds to the first variant. It is obvious that recursion formula (18) is simpler to apply than the formula (8), since no calculation of a time average at each iteration is required.

It will now be shown that in the second variant, which uses recursion formula (18) for the adjustment of the coefficients $\vec{c}(n)$, there is obtained at the output of difference circuit 31 a signal in which the linear component of the echo signal has been substantially suppressed. At the output of this difference circuit a variable-phase signal is obtained which, in contrast to the first variant, differs from the variable-phase component of the composite echo signal. Anyhow, variable-phase echo canceller 28 is capable of cancelling the variable-phase signal produced by linear echo canceller 27.

To prove this, formula (11) which is an expression for the quantity $I(n) = E[e_f(n) \cdot \vec{D}(n)]$ used in recursion formula (18) will be the starting point. Then it can easily be shown that recursion formula (18) may be written as:

$$\vec{c}^{i+1}(n) = \vec{c}^i(n)(1 - \alpha) + \alpha \vec{h} + \alpha \vec{k} \cdot \exp[j \phi(n)] \quad (19)$$

This formula may be compared with formula (13) for the first variant, in which the term $\alpha \vec{k} \cdot \exp[j\phi(n)]$ is zero, as a time average operation figures in recursion formula (8) for this first variant.

To continue the proof, the coefficient vector $\vec{c}(n)$ is decomposed into two vectors $\vec{u}(n)$ and $\vec{v}(n)$ in such a way that:

$$\vec{c}(n) = \vec{u}(n) + \vec{v}(n) \cdot \exp[j\phi(n)] \quad (20)$$

and it is assumed that $\exp[j\phi(n-1)]/\exp[j\phi(n)] = \theta$, where $\theta$ is a constant, which is the case for the variable phase of an echo signal resulting from a frequency offset of the carrier. In this case it holds namely that $\phi(n) = n \cdot \Delta\omega \cdot T$ and $\theta = \exp[j\Delta\omega T]$, where $\Delta\omega$ is the constant variation of the frequency $\omega$ of the carrier during each time interval T.

By taking account of resolution formula (20), it can be easily demonstrated that recursion formula (19) may be replaced by the two recursion formulae:

$$\begin{cases} \vec{u}^{i+1}(n) = \vec{u}^i(n)(1-\alpha) + \alpha\vec{h} \\ \vec{v}^{i+1}(n) = \vec{v}^i(n)\left(\frac{1-\alpha}{\theta}\right) + \frac{\alpha}{\theta}\vec{k} \end{cases} \quad (21)$$

When the classical form of these two recursion formulae is taken account of, it can be shown that for $i \to \infty$ the two resolving factors $\vec{u}^i(n)$ and $\vec{v}^i(n)$ may be written as:

$$\begin{cases} \vec{u}^i(n) = (1-\alpha)^i[\vec{u}^0(n) - \vec{h}] + \vec{h} \\ \vec{v}^i(n) = \left(\frac{1-\alpha}{\theta}\right)^i\left[\vec{v}^0(n) - \frac{\alpha\vec{k}}{\theta+\alpha-1}\right] \\ + \frac{\alpha\vec{k}}{\theta+\alpha-1} \end{cases} \quad (22)$$

If, on the one hand, the coefficient $\alpha$ is chosen so that $0 < \alpha < 1$, and if, on the other hand, it holds that $|1-\alpha| < |\theta|$, which is satisfied in the case of a frequency offset as $|\theta| = \exp(j\Delta\omega T) = 1$, the two formulae (22) for $i \to \infty$ become:

$$\begin{cases} \vec{u}^i(n) = \vec{h} \\ \vec{v}^i(n) \frac{\alpha\vec{k}}{\theta+\alpha-1} \end{cases}$$

Inserting these two values in formula (20) results in the value $\vec{c}^i(n)$ of the coefficients for $i \to \infty$:

$$\vec{c}^i(n) = \vec{h} + \frac{\alpha\vec{k}}{\theta+\alpha-1} \exp[j\phi(n)]$$

By inserting this value $c^i(n)$ of the coefficients in formula (6), which establishes the error signal $e_f(n)$ at the output of difference circuit 31, the following expression is obtained:

$$e_f(n) = \epsilon_f(n) = \underline{D}(n) \frac{\alpha\vec{k}}{\theta+\alpha-1} \exp[j\phi(n)] \quad (23)$$

Thus, it has been shown that by using recursion formula (17), the error signal $e_f(n)$, after a sufficient number of iterations, no longer contains the linear component $\epsilon_p(n)$ of the composite echo signal; this error signal $e_f(n)$ contains the variable-phase component $\epsilon_f(n)$ of the composite echo signal, combined with a variable-phase signal which is represented by the second term of formula (23). The error signal $e_f(n)$ may then be brought to the following form:

$$e_f(n) = \underline{D}(n)\left[\frac{\theta-1}{\theta+\alpha-1}\right] \vec{k} \exp[j\phi(n)]$$

The variable-phase echo canceller 28 can fully cancel such a signal $e_f(n)$ having variable phase $\phi(n)$.

The use of recursion formula (18) in control circuit 30 for the coefficients may be performed in accordance with the block diagram of FIG. 4, the description of which will be given in comparison with the block diagram of FIG. 3. Corresponding elements in these two Figures are given the same reference numerals.

Figure 4:
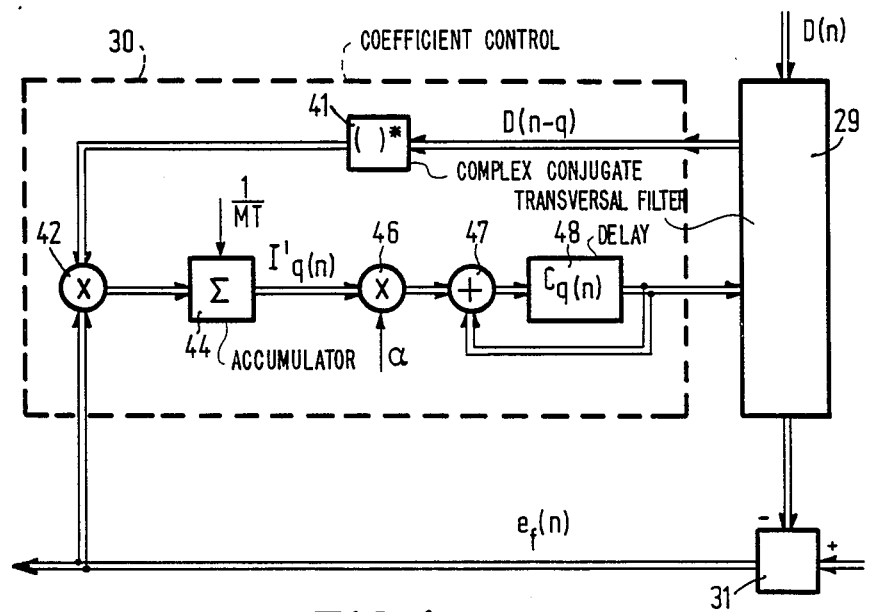

The recursion formula used in the block diagram of FIG. 4 for a coefficient $c_q(n)$ is:

$$c_q^{i+1}(n) = c_q^i(n) + \alpha E(e_f(n) \cdot D^*(n-q)]D$$

This formula may be compared with formula (14) which is used in the block diagram of FIG. 3. In FIG. 4, circuit 44 forms, as also in FIG. 3, at a rate 1/MT, the approximate value $I'_q(n)$ of the term $$I_q(n) = E[e_f(n) \cdot D^*(n - q)]$$

by performing the calculations given in formula (15). The output of circuit 44 is directly applied to multiplier 46 which forms the product $\alpha I'_q(n)$, being the modifying term of the coefficient. By means of adder 47 this modifying term is added at each iteration i to the coefficient $c_q{}^i(n)$ at the output of delay circuit 48 for forming the coefficient $c_q{}^{i+1}(n)$ to be used at iteration i+1. In the present case, the rate of the iterations is 1/MT and the delay produced by circuit 48 amounts to MT.

In a similar manner as in control circuit 30 of FIG. 3, calculation circuit 44 might also be omitted in FIG. 4 by using a coefficient $\alpha'$ which is very small relative to 1, at the cost of an increase of the convergence time of the coefficients. This possibility to simplify control circuit 30 of FIG. 3 and FIG. 4 by using a coefficient $\alpha'$ which is very small relative to 1 may also be used in further variants which will be described hereinafter; no separate mention thereof will be made.

In the two variants of the echo cancelling arrangement having a series structure as shown in FIG. 2, the complex version $\epsilon(n)$ of the composite echo signal, appearing at the receive access of hybrid junction 6 of the modem, is applied to the arrangement; all the calculations performed relate to complex numbers and, in particular, use is made of complex error signals for adjusting the variable elements of the two echo cancellers 27 and 28.

Two other variants of the echo cancelling arrangements having a series structure will now be described, the composite echo signal appearing at the receive access of hybrid junction 6, which echo signal is real, being applied directly to the arrangement. In these two novel variants, linear echo canceller 27 operates with a real error signal, while variable-phase echo canceller 28 can also operate with a real error signal. The 90° phase shifter 33 is then omitted, while certain calculations in the two echo cancellers are simplified, particularly in their transversal filters.

Figure 5:
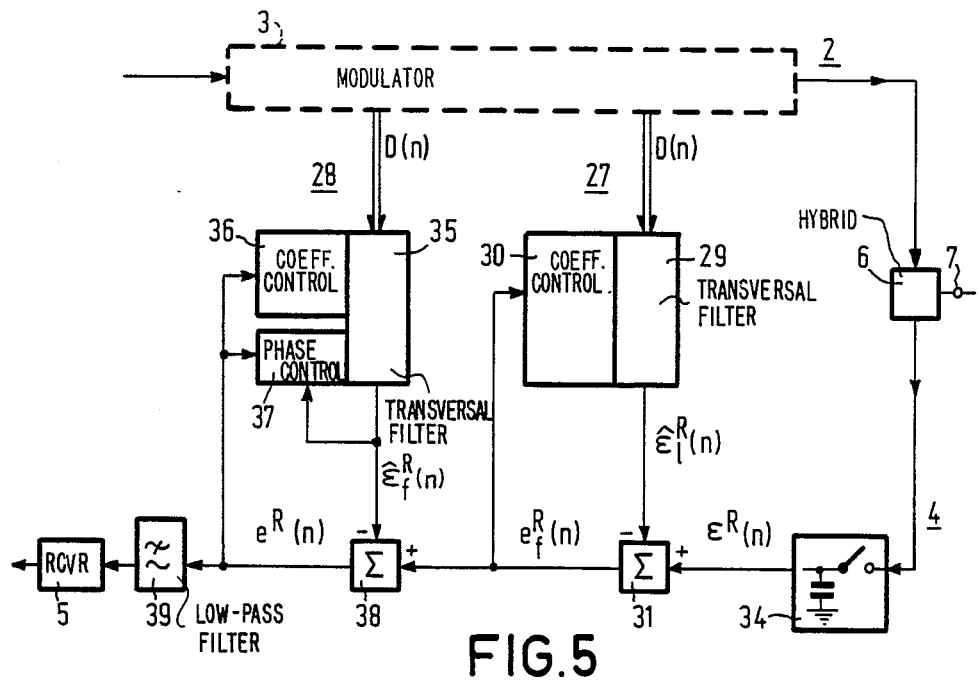
FIG. 5 shows a block diagram of an arrangement in accordance with the invention having a series structure which employs real difference signals.

The general structure of the echo cancelling arrangement corresponding with these two further variants is shown in the block diagram of FIG. 5. This diagram will be described by comparing it with the block diagram of FIG. 2, corresponding elements in these two diagrams being given the same reference numerals. Also the same notations are used for the signals, however provided with the index R if real signals, which may be considered to be the real part of complex signals, are involved.

In FIG. 5, the composite echo signal to be cancelled appearing at the receive access of hybrid junction 6 is directly sampled by circuit 34 and thereafter applied to the (+) input of difference circuit 31. The signal applied to this input is real and is designated $\epsilon^R(n)$. It is the sum of a linear component $\epsilon_p{}^R(n)$ and a variable-phase component $\epsilon_f{}^R(n)$. Linear echo canceller 27 comprises transversal filter 29, which receives complex data signal D(n) from modulator 3, is accompanied with control circuit 30 for controlling its complex coefficients $\vec{c}(n)$ and is arranged to supply only the real part of the numbers calculated in accordance with formula (1) mentioned in the foregoing. These numbers constitute the real signal $\hat{\epsilon}_p{}^R(n)$ applied to the other (−) input of difference circuit 31. Difference circuit 31 produces the real difference signal $e_f{}^R(n)$ given by:

$$e_f{}^R(n) = \hat{\epsilon}^R(n) - \hat{\epsilon}_l{}^R(n) = \epsilon_l{}^R(n) + \epsilon_f{}^R(n) - \hat{\epsilon}_l{}^R(n)$$

This signal $e_f{}^R(n)$ is employed in control circuit 30 for adjusting the coefficients c(n) by consecutive iterations, so that after convergence of said coefficients the real signal $\hat{\epsilon}_p{}^R(n)$ is identical to the linear component $\epsilon_p{}^R(n)$. There now follows a description of the recursion formulae to be used in control circuit 30 of these two novel variants. In these two variants there subsists in the real difference signal $e_f{}^R(n)$ only the real part of the variable-phase signal which is applied to variable-phase echo canceller 28. This echo canceller 28 has the same structure as shown in FIG. 2 but is arranged to cancel the real variable-phase signal applied to its difference circuit 38 on the bases of the real signals produced by its adjustable signal processing arrangement 35 and the real error signal $e^R(n)$ produced by its difference circuit 38. A variable-phase echo canceller of this type is disclosed in, for example, the above-mentioned U.S. patent application Ser. No. 06/704,895.

The calculation methods by means of which the recursion formulae are derived to be used in the arrangement shown in FIG. 5 for the adjustment of the coefficients $\vec{c}(n)$ of linear echo canceller 27, are of the same type as the methods which were already explained for the arrangement of FIG. 2 and will not be described in detail again.

In a first variant, the criterion used is the minimization of the quantity $$E \, |e_f{}^R(n)|^2,$$

while in a second variant the criterion is the minimization of the quantity $E|e_f{}^R(n)|^2$.

Employing the gradient algorithm, the recursion formula for the first variant has the general form:

$$\vec{c}^{i+1}(n) = \vec{c}^i - \frac{\alpha}{2} \cdot \frac{\partial E|e_f{}^R(n)|^2}{\partial \vec{c}(n)}$$

It can now be shown that:

$$\frac{\partial E|e_f{}^R(n)|^2}{\partial \vec{c}(n)} = -2 \, e_f{}^R(n) \cdot \vec{D}(n)$$

Consequently, the recursion formula to be finally used in circuit 30 for the first variant may be written as:

$$\vec{c}^{i+1}(n) = \vec{c}^i(n) + \alpha \cdot \overline{e_f{}^R(n) \cdot \vec{D}^*(n)} \qquad (24)$$

In the same form, the recursion formula for the second variant is written as:

$$\vec{c}^{i+1}(n) = \vec{c}^i(n) + \alpha \cdot e_f{}^R(n) \cdot \vec{D}^*(n) \qquad (25)$$

Employing the same method as that already explained for recursion formula (8), it can be shown that in the variant employing recursion formula (24), the coefficients $\vec{c}(n)$ of filter 29 converge to such values that the linear component $\epsilon_p{}^R(n)$ in the difference signal $e_f{}^R(n)$ is cancelled and that there only subsists in this difference signal the variable-phase component $\epsilon_f{}^R(n)$ present in the composite echo signal. The echo canceller 28 can cancel this component.

It can also be shown that in the variant employing recursion formula (25), the coefficients $\vec{c}(n)$ of filter 29 converge to values which cancel the linear components $\epsilon_\rho^R(n)$ in the difference signal $e_f^R(n)$; only the real part of a variable-phase signal having the form of the real part of the signal given by formula (23) subsists in this difference signal. The echo canceller 28 can also cancel such a real variable-phase signal.

Control circuits 30 employing the recursion formula (24) and (25) can be realized in accordance with the respective diagrams shown in FIG. 3 and FIG. 4 on the condition that the error signal $e_f^R(n)$ is applied to multiplier circuit 42 instead of the complex error signal $e_f(n)$.

Figure 6:
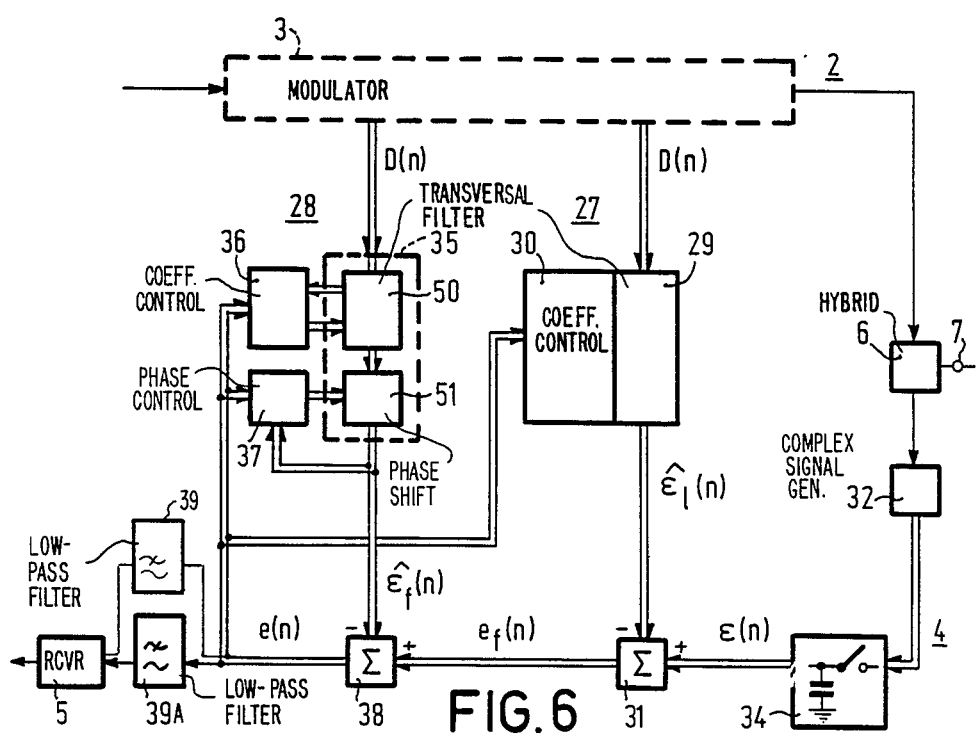
FIG. 6 and FIG. 7 show a block diagram of the arrangement in accordance with the invention having a parallel structure, corresponding to two possible embodiments of the variable-phase echo canceller.

FIG. 6 shows the block diagram of an embodiment of the echo cancelling arrangement in accordance with the invention, the cancelling arrangement having what is referred to as a parallel structure. Elements in this diagram which correspond to the elements in the block diagram of the arrangement shown in FIG. 2 having a series structure are given the same reference numerals. In these two block diagrams, the echo cancelling arrangement employs the complex version of the composite echo signal appearing at the receive access of hybrid junction 6. All the elements are connected in the same manner, except for control circuit 30 which in FIG. 6 receives the signal produced by difference circuit 38 of variable-phase echo canceller 28 to adjust the coefficients of linear echo canceller 27. In this structure, the control circuits of the two echo cancellers 27 and 28 are consequently controlled by the same difference signal.

With this parallel structure, it can be achieved, by means of a suitable iterative adjustment of the coefficients of linear echo canceller 27, that the linear component of the composite echo signal is cancelled in the signal produced by difference circuit 31, so that the remaining variable-phase component can be cancelled by echo canceller 28.

In the continuation of the explanations, all the signals and notations defined above will be used. In addition, it is necessary to further define the type of variable-phase echo canceller used and to define some quantities and signals relating thereto. In FIG. 6 it is assumed that variable-phase echo canceller 28 is realized in accordance with a variant described in the U.S. patent application Ser. No. 247,195 already mentioned in the foregoing, in accordance with which variant the adjustable signal processing arrangement 35 is formed by a transversal filter 50 followed by a phase shifter 51 whose output is connected to an input of difference circuit 38. Transversal filter 50 receives data signal D(n) and its coefficient $d_q(n)$ are adjusted by control circuit 36. In vector notation, the output signal of transversal filter 50 may be written as $\underline{D}(n).\vec{d}(n)$. Phase shifter 51 changes the phase of the signal produced by transversal filter 50 in accordance with the simulated phase $\hat{\phi}(n)$ formed in control circuit 37 in such a way that the latter phase is equal to the phase of the signal $e_f(n)$ applied to difference circuit 38. The signal $\hat{\epsilon}_f(n)$ applied by phase shifter 51 to difference circuit 38 is then written as:

$$\hat{\epsilon}_f(n) = \underline{D}(n) \cdot \vec{d}(n) \cdot \exp[j\hat{\phi}(n)] \qquad (26)$$

With the notations used, the difference signal e(n) employed for adjusting the two echo cancellers 27 and 28 is written as:

$$e(n) = e_f(n) - \hat{\epsilon}_f(n) \qquad (27)$$

Now it will be explained how the adjustment of the coefficients of linear echo canceller 27 can be performed in order to achieve that no linear component of the composite echo signals remains at the output of its difference circuit 31.

In a first variant of the parallel structure shown in FIG. 6, the criterion used is the minimization of the quantity $$\overline{E|e(n)|^2}$$

so that the recursion formula employed in control circuit 30 for adjusting the coefficients $\vec{c}(n)$ is written in the general form as:

$$\vec{c}^{i+1}(n) = \vec{c}^i(n) - \frac{\alpha}{2} \frac{\overline{\partial E|e(n)|^2}}{\partial c(n)}$$

When formulae (6) and (27) are taken into account, e(n) may be written as:

$$e(n) = \underline{D}(n)[\vec{h} - \vec{c}(n)] + \epsilon_f(n) - \hat{\epsilon}_f(n) \qquad (28)$$

With the same method as used in the foregoing it can be shown that:

$$\frac{\overline{\partial E|e(n)|^2}}{\partial \vec{c}(n)} = -2E[e(n) \cdot \vec{D}^*(n)].$$

So the recursion formula derived from the above criterion may finally be written as:

$$\vec{c}^{i+1}(n) = \vec{c}^i(n) + \alpha \overline{E[e(n) \cdot \vec{D}^*(n)]} \qquad (29)$$

Now it will be shown that the use of this recursion formula makes it possible to cancel the linear component of the composite echo signal by means of the echo canceller 27. A quantity K(n) is introduced by $$K(n) = E[e(n) \cdot \vec{D}^*(n)]$$

By replacing e(n) in this formula by its expression in accordance with formula (28) and by taking account of the fact that the quantity $$E[\underline{D}(n) \cdot \vec{D}^*(n)]$$

is equal to the identity matrix, it can be shown that:

$$K(n) = \vec{h} - \vec{c}(n) + E[\epsilon_f(n) \cdot \vec{D}^*(n) - \hat{\epsilon}_f(n) \cdot \vec{D}^*(n)]$$

By replacing $\epsilon_f(n)$ and $\hat{\epsilon}_f(n)$ in this formula by their expressions given in formulae (3) and (25) and by furthermore taking into account of the fact that the quantity $$[D^*(n) \cdot D(n)]$$

is identical to the identity matrix, it can be shown that:

$$K(n) = \vec{h} - \vec{c}(n) + E[\vec{k}\exp(j\,\phi(n)) - \vec{d}(n)\exp(j\,\hat{\phi}(n))]$$

But in accordance with formula (29) the quantity L(n) to be calculated at each iteration for modifying the coefficients $\vec{c}^i(n)$ is given by:

$$L(n) = \overline{E[e(n) \cdot \vec{D}^*(n)]} = \overline{K(n)} =$$
$$= \vec{h} - \vec{c}(n) + \vec{k} \cdot \overline{\exp(j\,\phi(n))} - \vec{d}(n)$$
$$\overline{\exp(j\,\hat{\phi}(n))}$$

Since it is assumed that the case is considered in which the time average of the variable phase $\phi(n)$ is zero and since the simulated phase $\hat{\phi}(n)$ is controlled at $\phi(n)$, it holds that $$\overline{\phi(n)} = 0, \overline{\hat{\phi}(n)} = 0$$

and it finally follows that:

$$L(n) = \vec{h} - \vec{c}(n).$$

By replacing in recursion formula (29) the quantity $$L(n) = \overline{E[e(n) \cdot \vec{D}^*(n)]}$$

by its value $\vec{h} - \vec{c}^i(n)$ at iteration i, it is possible to show by means of a method already used that the coefficients $\vec{c}^i(n)$ of transversal filter 29 converge to $\vec{h}$ when $i \to \infty$; in accordance with formula (6) this shows that the difference signal $e_f(n)$ produced by echo canceller 27 does not contain any longer the linear component $\epsilon_p(n)$ and that it is equal to the variable-phase component $\epsilon_f(n)$ of the composite echo signal.

In a second variant of the parallel structure of FIG. 6, the criterion used is the minimization of the quantity $E|e(n)|^2$. According to the explanations just given for the first variant, it is obvious that the recursion formula to be employed in echo canceller 27 for that second variant is given by:

$$\vec{c}^{i+1}(n) = \vec{c}^i(n) + \alpha E[e(n) \cdot \vec{D}(n)] \tag{30}$$

It can be checked that by employing recursion formula (30) the coefficients $\vec{c}(n)$ of echo canceller 27 converge to values which effect in the difference signal $e_f(n)$ a cancellation of the linear component $\epsilon_p(n)$ of the composite echo signal and that in this difference signal there only subsists a signal having a variable phase $\phi(n)$ which signal can be cancelled by echo canceller 28.

Control circuits 30 employing recursion formulae (29) and (30) can be realized in accordance with block diagrams shown in FIG. 3 and FIG. 4, respectively, on the condition that the error signal e(n) instead of the error signal $e_f(n)$ is applied to multiplying circuit 42.

The measure recommended for the series structure and illustrated in FIG. 5 may also be applied to this parallel structure, which measure consists of the direct use in the echo cancelling arrangement of the real signal received from hybrid junction 6 and which, after having been sampled in sampling circuit 34 is designated $e^R(n)$. The corresponding diagram can easily be constructed on the basis of FIG. 6 by omitting circuit 32 for forming a complex signal therefrom. Difference circuits 31 and 38 receive and supply only real signals; control circuit 30 for linear echo canceller 27 and control circuits 36 and 37 of variable-phase echo canceller 28 are controlled by the real error signal $e^R(n)$ produced by difference circuit 31. The recursion formulae which may be employed in control circuit 30 for adjusting the coefficients $\vec{c}(n)$ are the formulae (29) or (30) in which the complex error signal e(n) is replaced by the real error signal $e^R(n)$. Control circuit 30 can be realized in accordance with the block diagram of FIG. 3 or FIG. 4 in order to employ the formulae (29) or (30) by applying the real signal $e^R(n)$ to multiplying circuit 42.

Figure 7:
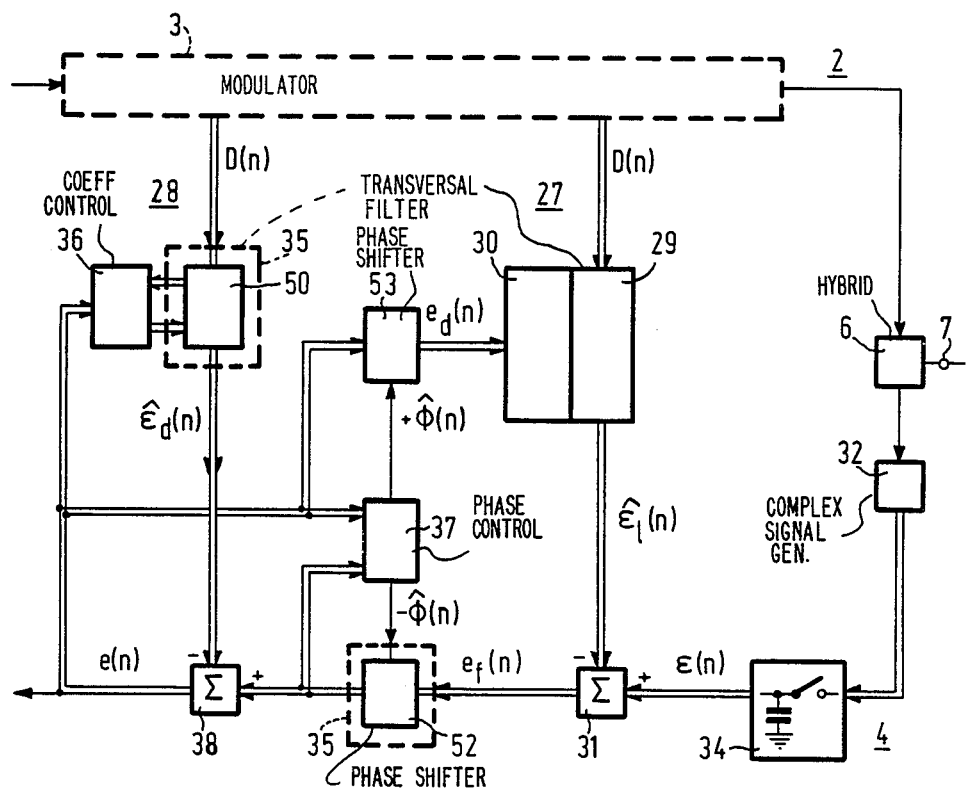

FIG. 7 shows a further variant of the arrangement according to the invention, also having a parallel structure. The difference with the arrangement shown in FIG. 6 resides in a different configuration of the adjustable signal processing arrangement 35 in variable-phase echo canceller 28. In this configuration, which corresponds to a variant of the variable-phase echo canceller disclosed in U.S. patent application Ser. No. 247,195 mentioned in the foregoing, arrangement 35 also comprises transversal filter 50 receiving data signal D(n), but instead of using, as in FIG. 6, a phase shifter 51 which changes the phase of the signal supplied by filter 50 by an amount $+\hat{\phi}(n)$ before applying this signal to the (−) output of difference circuit 38, FIG. 7 employs a phase shifter 52 which changes the phase of the signal $e_f(n)$ supplied by echo canceller 27 by an amount $-\hat{\phi}(n)$ before this signal is applied to the (+) input of difference circuit 38. The fact is recalled that $\hat{\phi}(n)$ is a phase which is formed in such a manner in phase control circuit 37 that this phase $\hat{\phi}(n)$ is equal to the variable phase $\phi(n)$ of the signal $e_f(n)$.

If in this case the signal supplied by transversal filter 50 is designated $\phi_d(n)$, it can be easily shown that the difference signal e(n) used for adjusting the two echo cancellers 27 and 28 has the following expression which differs from formula (28):

$$e(n) = [D(n)[\vec{h} - \vec{c}(n)] + \epsilon_f(n)] \cdot$$
$$\exp[-j\phi(n)] - \epsilon_d(n)$$

By means of the above explained method it can be shown that with this expression for e(n) the following equation holds:

$$\frac{\partial |e(n)|^2}{\partial \vec{c}(n)} = -2 \cdot e(n) \cdot \vec{D}(n) \cdot \exp j\,\hat{\phi}(n)$$

If the criterion employed in echo canceller 27 for adjusting the coefficients c(n) is the minimization of the quantity $E|e(n)|^2$, it follows from this equation that the recursion formula to be used for this adjustment is given by:

$$\vec{c}^{i+1}(n) = \vec{c}^i(n) + \alpha E[e(n) \cdot \vec{D}(n) \cdot \exp[j\,\hat{\phi}(n)]] \tag{31}$$

or:

$$\vec{c}^{i+1}(n) = \vec{c}^i(n) + \alpha E[e_d(n) \cdot \vec{D}(n)]$$

where:

-continued $$e_d(n) = e(n) \cdot \exp[j\,\hat{\phi}(n)]$$

For the implementation of recursion formula (31) in control circuit 30, it is possible, as shown in FIG. 7, to form the signal $e_d(n)$ by means of a phase shifter 53 which modifies the phase of the error signal e(n) by an amount $+\hat{\phi}(n)$ produced by control circuit 37. Control circuit 30 then uses this signal $e_d(n)$ for modifying the coefficients $\vec{c}(n)$. After the preceding it will be obvious that this circuit 30 may be constructed in a manner shown in the block diagram of FIG. 4 by applying the signal $e_d(n)$ to multiplying circuit 42.

In the parallel structure illustrated in FIG. 7, a criterion consisting of the minimization of the quantity $E|e^R(n)|^2$, where $e^R(n)$ is the real part of the difference signal appearing at the output of difference circuit 38, may also be used for adjusting the two echo cancellers 27 and 28. As regards variable-phase echo canceller 28, embodiments corresponding with this criterion are described in the above-mentioned U.S. patent application Ser. No. 06/704,895. In that case, it is always necessary that circuit 32 forms the complex version of the signal appearing at the receive access of hybrid junction 6 and that, in addition, a phase shifter 52 is used which changes the phase of the complex difference signal supplied by difference circuit 31 by an amount $-\hat{\phi}(n)$. However, in variable-phase echo canceller 28, difference circuit 38 forms an error signal $e^R(n)$ as the difference between the real part of the signal produced by phase shifter 52 and the real part of the signal supplied by transversal filter 50. Control circuit 36 for adjusting the coefficients of filter 50 is controlled by the error signal $e^R(n)$, while control circuit 37 for adjusting the phase $\hat{\phi}(n)$ is controlled by this error signal $e^R(n)$ and by the imaginary part of the signals produced by phase shifter 52. As regards linear echo canceller 27 the recursion formula to be used is:

$$\vec{c}^{i+1}(n) = \vec{c}^i(n) + \alpha E[e_d'(n) \cdot \vec{D}(n)] \quad (32)$$

where:

$$e_d'(n) = e^R(n) \cdot \exp[j\,\hat{\phi}(n)]$$

To use this recursion formula (32), it is sufficient to apply to phase shifter 53 the real signal $e^R(n)$ supplied by difference circuit 38 in order to obtain the complex signal $e'_d(n)$ at the output of this phase shifter 53; control circuit 30 for adjusting the coefficients may then correspond to the block diagram of FIG. 4 by applying the signal $e'_d(n)$ to multiplying circuit 42.

The circuit diagrams of the two series and parallel structures of the arrangement in accordance with the invention, which have been described for the case that the composite echo signal contains two components, are easy to implement for the event that the composite echo signal contains more than two components.

In the preceding block diagrams of the echo cancelling arrangement in accordance with the invention, transversal filter 29 of linear echo canceller 27 was completely isolated from transversal filter 50 of variable-phase echo canceller 28. But in practice it is possible to simplify the implementation of these two transversal filters by employing elements which they use jointly, by taking account of the characteristics of the echo signals to be cancelled and finally by a judicious use of the property of the variable-phase canceller that 28 this canceller is also capable of cancelling a fixed-phase echo, i.e. a linear echo.

As has already been mentioned in the foregoing, the calculations to be performed in transversal filter 29 of linear echo canceller 27 in order to obtain the output signal $\hat{\epsilon}_p(n)$ of this filter have the following form:

$$\hat{\epsilon}_l(n) = \sum_{q=0}^{N-1} D(n-q) \cdot c_q(n) \quad (33)$$

These calculations can be performed by means of a memory, for example a delay line producing a total time delay NT and supplying N delayed samples D(n-q) of the signal D(n) at N taps with a delay T between consecutive samples, and by means of N multiplying circuits forming the products of these samples and the filter coefficients $c_q(n)$, these products being added together at a rate 1/T.

The calculations to be performed in transversal filter 50 of variable-phase echo canceller 28, in order to obtain the output signal $\emptyset_d(n)$ of this filter, have a form similar to formula (33), so $$\hat{\epsilon}_d(n) = \sum_{p=0}^{L-1} D(n-q) \cdot d_p(n) \quad (34)$$

These calculations can also be performed by means of a delay line, now producing a total time delay LT and supplying L delayed samples D(n-p) at L taps, and by means of L multiplying circuits forming the product of these samples and the coefficients $d_p(n)$, said products being added together at a rate 1/T.

In order to implement the two transversal filters 29 and 50 it is of course possible to use a same delay line having the maximum delay LT required for the cancellation of the composite echo, and to connect to the L taps of this delay line the same number of circuits for multiplication by coefficients of transversal filter 29 and the same number of circuits for multiplication by coefficients of transversal filter 50.

It is, however, possible to reduce the number of these very costly multiplying circuits by taking account of the characteristics of the composite echo signal to be cancelled, characteristics which will be further explained with reference to FIG. 1. In accordance with this FIG. 1 already described, the elements which are capable of producing an echo signal in modem 1 are:

hybrid junction 6 which may produce a linear echo denoted local linear echo;

line 12 which may produce a linear echo, the carrier section located between hybrid junctions 10 and 11 which may produce a variable-phase echo, line 13 which may produce a linear echo.

It should be noted that the carrier section, which may produce a variable-phase echo, may be located at any distance from modem 1 and more particularly the nearest line 12 may have zero length. On the other hand, if the carrier section produces a frequency offset and if a linear echo occurs in the remotest line 13, this echo may be affected by a variable phase when returning to modem 1. Finally, it is also possible that the carrier section does not produce a frequency offset if the frequencies $f_1$, $f_2$, $f'_1$, $f'_2$ satisfy the condition $(f'_1-f_1)=(f'_2-f_2)$, so that the echo returning to modem 1 is then only of the linear type, which of course is also the case if the echo does not pass through a carrier section.

Figure 8:
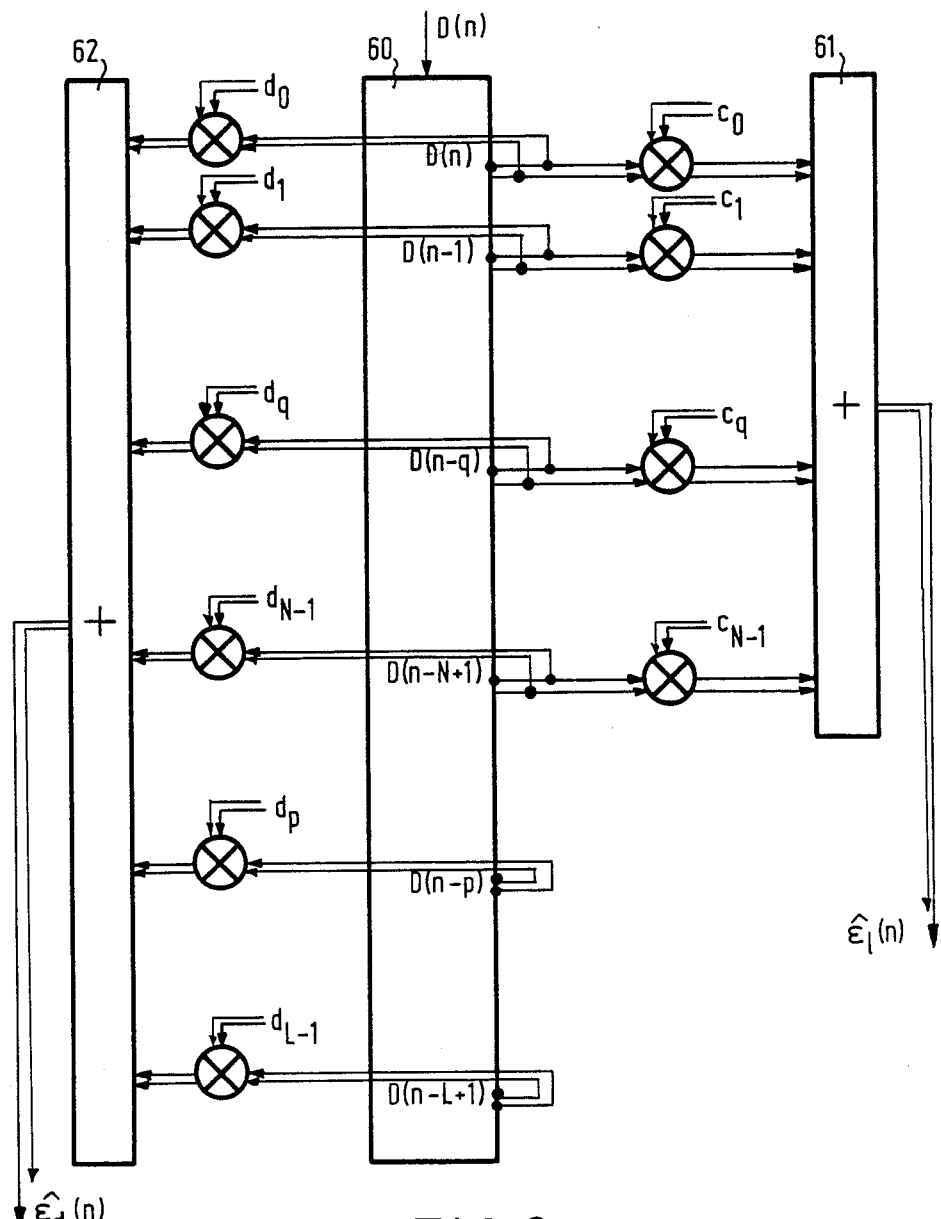
FIG. 8 shows in outline an embodiment of the transversal filters of the linear echo canceller and the variable-phase echo canceller.

The echo cancelling arrangement to be provided in modem 1 must consequently be capable of cancelling a local linear echo produced by hybrid junction 6, on which a, what is referred to as a, far echo produced in the connection between the two modems 1 and 8 can be superposed, it being possible that this far echo is wholly of the linear type or wholly of the variable-phase type or a combination of these two types. If $t_p$ is the interval within which the local linear echo may occur which is produced by hybrid junction 6 and, possibly, by a fixed portion of the nearest line 12, and if $t_d$ is the maximum interval in which the far echo may occur, it of course holds that $t_d > t_p$. FIG. 8 shows a block diagram which so combines the two transversal filters 29 and 50 of the two echo cancellers 27 and 28 that the number of multiplying circuits used in these filters is reduced in an optimum way.

The block diagram of FIG. 8 comprises a delay line 60 receiving the data signal D(n), producing a total delay $LT = t_d$ and having L taps, at which there appear consecutive samples of data signal D(n) with a mutual time delay T. A first portion of this delay line has N taps, (N−L), at which N samples D(n−q) of signal D(n) appear, q varying from 0 to N-1. This first portion produces in its totality a delay $NT = t_p$. These N taps are connected to N multiplying circuits for forming the products of the N samples D(n-q) and N coefficients $c_q$. The outputs of these multiplying circuits are connected to a summing circuit 61 forming samples of the signal $\hat{e}_p(n)$ in accordance with formula (33). This portion of the block diagram just described forms transversal filter 29 of linear echo canceller 27.

At the assembly of the L taps of the delay line, which comprises the N taps of the first section, there appear L samples D(n-p) of the signal D(n), p varying from 0 to L-1. These L taps are connected to L multiplying circuits forming the products of the L samples D(n-p) and L coefficients $d_p$. The outputs of these multiplying circuits are connected to a summing circuit 62 forming samples of the signal $\hat{e}_d(n)$ in accordance with formula (34). This portion of the block diagram just described forms transversal filter 50 of variable-phase echo canceller 28.

The portion of the arrangement of FIG. 5 located to the right of delay line 60 and supplying the signal $\hat{e}_p(n)$ permits cancellation of the local linear echo. The portion to the left of delay line 60 supplying the signal $\hat{e}_d(n)$ permits the cancellation of the far variable-phase echo when this variable-phase echo occurs. But this left-hand portion also permits cancellation of a far linear echo when the far echo has not been subjected to frequency offset.

In the foregoing, the echo cancelling arrangement in accordance with the invention is described for its application for data transmission. But it will be obvious that this arrangement may alternatively be used in a telephone signal transmission system where the same problem of cancelling a composite echo signal may be encountered.

What is claimed is:

1. Apparatus for cancelling an echo signal, the echo signal arising in a receive path of a data communication device as a result of a send signal appearing in a send path of the device, the echo signal being a composite signal including a phase variable and a linear component, the apparatus comprising:
   a. a linear echo canceller comprising:
      i. an input for receiving a complex representation of the send signal;
      ii. a transversal filter having adjustable coefficients and comprising means for storing samples D(n) of the representation of the send signal;
      iii. a coefficients control circuit for adjusting the coefficients in the linear transversal filter, the coefficients control circuit having an input coupled to the receive path for receiving a residual echo signal from which the linear synthetic echo signal has been subtracted; and
      iv. an output for supplying a synthetic echo signal representing an approximation of the linear component of the echo signal; and
   b. a variable-phase echo canceller comprising:
      i. an input for receiving a complex representation of the send signal;
      ii. a transversal filter having adjustable coefficients and comprising means for storing samples D(n) of the representation of the send signal and an output;
      iii. a coefficients control circuit for adjusting the coefficients in the variable-phase transversal filter, the coefficients control circuit having an input coupled to the receive path for receiving a residual echo signal from which the variable-phase synthetic echo signal has been subtracted;
      iv. means for compensating for the variable-phase component of the echo signal; and
      v. an output for supplying a synthetic echo signal representing an approximation of the variable-phase component of the echo signal;
   c. first and second difference circuits, disposed in cascade within the receive path, each difference circuit corresponding to a respective one of the linear and variable-phase echo cancellers and comprising:
      i. a first input connected in the receive path for receiving a first signal containing a representation of the echo signal;
      ii. a second input for receiving a second signal which contains at least a part of the respective synthetic echo signal from the respective echo canceller;
      iii. an output connected in the receive path for supplying thereto a respective residual echo signal representing a difference between signals received at the first and second inputs; wherein the improvement comprises that:
   d. the linear and variable-phase echo cancellers operate simultaneously to supply, at the output of the cascaded difference circuits, a combined residual echo signal in which both the linear and the variable-phase components of the echo signal are reduced; and
   e. the compensating means is disposed so that it has an output coupled with one of the inputs of the second difference circuit, the compensating means having a first input coupled with the output of the cascaded difference circuits and a second input coupled with one of the inputs of the second difference circuit.

2. The apparatus of claim 1 wherein:
   a. the first input of the second difference circuit is coupled to the output of the first difference circuit, whereby the respective residual echo signal output by the second difference circuit is the combined residual echo signal;

b. the coefficients control circuit of the linear echo canceller comprises for each coefficient $C_q(n)$:

i. first multiplying means for forming, at a symbol rate (1/T) of the send signal, a product of the combined residual echo signal and the complex conjugate value $D^*(n-q)$ of a sample $D(n-q)$ of the representation of the send signal;

ii. calculation means for forming at a rate 1/(MT), where M is an integer greater than 1, a statistical average $I'_q(n)$ of products previously formed by the multiplying means; and iii. second multiplying means for forming a product $\alpha I'_q(n)$, where $\alpha$ is a coefficient less than 1; and iv. means for incrementing at the rate 1/(MT) said coefficient $C_q(n)$ by the product $\alpha I'_q(n)$; and c. the compensating means comprises i. control means (37) having first and second inputs which are the first and second inputs of the compensating means; and ii. a phase compensating circuit (51) cooperating with the transversal filter, which phase compensating circuit has an output at the output of the variable phase echo canceller, which output of the phase compensating circuit is coupled with one of the inputs of the second difference circuit and fed back to the second input of the compensating means.

3. The apparatus of claim 2 wherein said calculation means comprises means for forming, at the rate 1/(MT), a sum of M most recent products produced by the first multiplying means.

4. The apparatus of claim 1 wherein:

a. the first input of the second difference circuit is coupled to the output of the first difference circuit, whereby the respective residual echo signal output by the second difference circuit is the combined residual echo signal; and b. the coefficients control circuit of the linear echo canceller comprises for each coefficient $C_q(n)$:

i. first multiplying means for forming, at a symbol rate (1/T) of the send signal, a product of the combined residual echo signal and the complex conjugate value $D^*(n-q)$ of a sample $D(n-q)$ of the representation of the send signal;

ii. first calculation means for forming at a rate 1/(MT), where M is an integer greater than 1, a statistical average $I'_q(n)$ of products previously formed by the multiply means;

iii. second calculation means for forming at a rate 1/(MPT), where P is an integer greater than 1, a time average $J'_q(n)$ of the statistical average $I'_q(n)$; and iv. second multiplying means for forming a product $\alpha J'_q(n)$ where $\alpha$ is a coefficient less than 1; and v. means for incrementing at the rate 1/(MPT) said coefficient $C_q(n)$ by the product $\alpha J'_q(n)$; and c. the compensating means comprises i. control means (37) having first and second inputs which are the first and second inputs of the compensating means; and ii. a phase compensating circuit (51) cooperating with the transversal filter, which phase compensating circuit has an output at the output of the variable phase echo canceller, which output of the phase compensating circuit is coupled with one of the inputs of the second difference circuit and fed back to the second input of the compensating means.

5. The apparatus of claim 4 wherein:

a. said first calculation means comprises means for forming at the rate 1/(MT), the sum of M most recent products produced by the first multiplying means; and b. said second calculation means comprises means for forming at a rate 1/(MPT) a sum of P most recent values of $I'_q(n)$.

6. The apparatus of claim 1 wherein a. the compensating means comprises i. control means (37) having first and second inputs which are the first and second inputs of the compensating means; and ii. a $\hat{\Phi}(n)$ phase compensating circuit (51) cooperating with the transversal filter, which phase compensating circuit has an output at the output of the variable phase echo canceller, which output of the phase compensating circuit is coupled with one of the inputs of the second difference circuit and fed back to the second input of the compensating means;

b. the coefficients control circuits both comprise, for each coefficient $C_q(n)$:

i. first multiplying means for forming, at a symbol rate (1/T) of the send signal, a product of the combined residual echo signal and the complex conjugate value $D^*(n-q)$ of a sample $D(n-q)$ of the representation of the send signal;

ii. second multiplying means for weighting the product formed by the first multiplying means by a number $\alpha$ which is small relative to 1; and iii. means for incrementing at the rate 1/T said coefficient $C_q(n)$ by a weighted product output by the second multiplying means; and c. the first input of the second difference circuit is coupled to the output of the first difference circuit, whereby the respective residual echo signal output by the second difference circuit is the combined residual echo signal, the second input of the second difference circuit being coupled to receive an output of the phase compensating means.

7. The apparatus of claim 1 wherein:

a. the compensating means comprises i. a $-\hat{\Phi}(n)$ phase compensation circuit having an input coupled with the output of the first difference circuit and an output coupled with the first input of the second difference circuit, so that phase compensation occurs in the first residual echo signal;

ii. a control circuit for forming a phase $\hat{\Phi}(n)$ which approximates the phase of the variable-phase component of the echo signal, and having first and second inputs which are the first and second inputs of the compensating means, the first input of the control circuit being coupled to the output of the $-\hat{\Phi}(n)$ phase compensation circuit, the control circuit having a first output coupled with a second input of the $-\hat{\Phi}(n)$ phase compensation circuit and a second output; and iii. a phase-shifting circuit for shifting by $+\hat{\Phi}(n)$ a phase of the difference signal appearing at the output of the second difference circuit and having an output at the coefficients control circuit of the linear echo canceller and having an input at the second output of the control circuit;

b. the coefficients control circuit of the linear echo canceller comprises for each coefficient $C_q(n)$:
  i. first multiplying means, coupled with the output of the $+\hat{\Phi}(n)$ phase-shifting circuit, for forming, at a symbol rate (1/T) of the send signal, a product of the combined residual echo signal phase shifted through $+\hat{\Phi}(n)$ and a complex conjugate value $D^*(n-q)$ of the sample $D(n-q)$;
  ii. means for forming, at a rate 1/(MT) where M is an integer greater than 1, a statistical average $I'_q(n)$ of products previously formed by the first multiplying means;
  iii. second multiplying means for forming a product $\alpha I'_q(n)$, where $\alpha$ is a coefficient less than 1; and
  iv. means for incrementing at the rate 1/(MT) said coefficients $C_q(n)$ by the product $\alpha I'_q(n)$.

8. The apparatus of claim 7 wherein said statistical average forming means comprises means for forming, at the rate 1/(MT) a sum of M most recent products produced by the first multiplying means.

9. The apparatus of claim 1 wherein:
  a. the compensating means comprises
    i. a $-\hat{\Phi}(n)$ phase compensating circuit (52) having an input coupled with the output of the first difference circuit and an output coupled with the first input of the second difference circuit; and
    ii. a phase shifting circuit (53) for shifting by $+\hat{\Phi}(n)$ a phase of the difference signal appearing at the output of the second difference circuit; and
  b. the coefficients control circuit of the linear echo canceller comprises for each coefficient $C_q(n)$:
    i. calculation means for forming, at a symbol rate 1/T of the send signal, a product of $+\hat{\Phi}(n)$ difference signal output by the phase compensating circuit and a complex conjugate value $D^*(n-q)$ of a sample $D(n-q)$ of the representation of the send signal;
    ii. means for weighting the product formed by the calculation means by a factor $\alpha$, which is small relative to 1; and
    iii. means for incrementing at a rate 1/T said coefficient $C_q(n)$ by a weighted product formed by the weighting means.

10. The apparatus of claims 1, 2, 3, 4, 5, 6, 7, 8, and 9, wherein:
  a. the echo signal comprises a linear local echo having a duration approximately NT, where N is a positive integer, and a far echo comprising at least one of a linear echo and a variable-phase echo, the far echo having a duration of approximately LT, where L is an integer greater than N; and wherein the apparatus comprises:
  b. means for storing L consecutive samples of a representation $D(n)$ of the send signal, having an input for receiving the L consecutive samples at a rate 1/T;
  c. means for forming a sum $\hat{\epsilon}_d(n)$ of products of the L consecutive samples with the respective coefficients of the transversal filter of the variable-phase echo canceller, the sum $\hat{\epsilon}_d(n)$ being provided as the output signal of the transversal filter of the variable-phase echo canceller;
  d. means for forming a sum $\hat{\epsilon}_l(n)$ of products of N most recent samples in the storing means and the coefficients of the transversal filter of the linear echo canceller, the sum $\hat{\epsilon}_l(n)$ being provided as the output of the transversal filter of the linear echo canceller.

* * * * *

UNITED STATES PATENT AND TRADEMARK OFFICE
CERTIFICATE OF CORRECTION

PATENT NO. : 4,862,450

DATED : August 29, 1989

INVENTOR(S) : LOIC B.Y. GUIDOUX

It is certified that error appears in the above-identified patent and that said Letters Patent is hereby corrected as shown below:

Column 1, line 8, after "abandoned." insert --This is also a continuation-in-part of application Serial No. 704,895, filed February 22, 1985, now abandoned, which was a continuation of of application Serial No. 581,223, filed February 22, 1984, now abandoned, which was a continuation of Serial No. 247,195, filed March 24, 1981, now abandoned.--.

Signed and Sealed this

Fifth Day of May, 1992

Attest:

DOUGLAS B. COMER

*Attesting Officer*  *Acting Commissioner of Patents and Trademarks*